United States Patent
Hwang

(10) Patent No.: US 12,321,971 B2
(45) Date of Patent: Jun. 3, 2025

(54) METHOD FOR PROVIDING SERVICE FOR GENERATING ROUTE BETWEEN REVIEW NFT USING SCM CODE AND VALUE-CHAIN

(71) Applicant: Tae Wook Hwang, Incheon (KR)

(72) Inventor: Tae Wook Hwang, Incheon (KR)

( * ) Notice: Subject to any disclaimer, the term of this patent is extended or adjusted under 35 U.S.C. 154(b) by 0 days.

(21) Appl. No.: 18/826,491

(22) Filed: Sep. 6, 2024

(65) Prior Publication Data

US 2024/0428305 A1    Dec. 26, 2024

Related U.S. Application Data

(63) Continuation of application No. PCT/KR2023/003230, filed on Mar. 9, 2023.

(30) Foreign Application Priority Data

Mar. 10, 2022 (KR) .......................... 10-2022-0030349

(51) Int. Cl.
*G06Q 30/00* (2023.01)
*G06Q 20/38* (2012.01)
*G06Q 30/0601* (2023.01)

(52) U.S. Cl.
CPC ....... *G06Q 30/0605* (2013.01); *G06Q 20/389* (2013.01); *G06Q 30/0609* (2013.01)

(58) Field of Classification Search
CPC ............. G06Q 30/0605; G06Q 20/389; G06Q 30/0609
See application file for complete search history.

(56) References Cited

U.S. PATENT DOCUMENTS

| 11,188,969 B2* | 11/2021 | Trim ................. G06Q 30/0629 |
| 2010/0276484 A1 | 11/2010 | Banerjee et al. |
| 2013/0221093 A1 | 8/2013 | Patel et al. |
| 2018/0349968 A1* | 12/2018 | O'Brien ............... H04L 9/3297 |

(Continued)

FOREIGN PATENT DOCUMENTS

| JP | 2020086938 A | 6/2020 |
| JP | 2021179700 A | 11/2021 |
| KR | 20180069356 A | 6/2018 |

(Continued)

OTHER PUBLICATIONS

Non-Fungible Token: A Systematic Review and Research Agenda Bao, Hong; Roubaud, David. Journal of Risk and Financial Management15.5: 215. MDPI AG. (2022).*

(Continued)

*Primary Examiner* — Robert M Pond
(74) *Attorney, Agent, or Firm* — Guntin & Gust, PLC; Miyoung Shin

(57) ABSTRACT

A method, performed by a computing device, for providing a service for generating a channel between a review NFT using an SCM code and a value-chain includes managing a transaction situation between a seller and a consumer by means of a management information system, identifying that the consumer has made a transaction and the transaction item when a purchase made by the consumer is confirmed, generating an SCM code for the identified item and providing the SCM code to the consumer, and generating channels of a third consumer and the review NFT generated by the consumer by using the SCM code.

6 Claims, 9 Drawing Sheets

(56) References Cited

U.S. PATENT DOCUMENTS

2021/0067342 A1* 3/2021 Guinard ................ H04L 9/0866
2023/0169578 A1* 6/2023 Krishna ............. G06Q 30/0625
　　　　　　　　　　　　　　　　　　　　　705/27.1

FOREIGN PATENT DOCUMENTS

| KR | 20200107393 A | 9/2020 |
| KR | 20200137818 A | 12/2020 |
| KR | 102322511 B1 | 11/2021 |

OTHER PUBLICATIONS

International Search Report (ISR) for Corresponding PCT Application No. PCT/KR2023/003230, mailed Jun. 23, 2024 (3 pages).
Notice of Allowance for Corresponding KR Patent Application No. 10-2022-0030349, mailed Sep. 27, 2023 and English translation (8 pages).

* cited by examiner

METHOD FOR PROVIDING SERVICE FOR GENERATING ROUTE BETWEEN REVIEW NFT USING SCM CODE AND VALUE-CHAIN

CROSS-REFERENCE TO RELATED APPLICATION(S)

This application is a continuation of PCT Patent Application No. PCT/KR2023/003230, filed Mar. 9, 2023, entitled "METHOD FOR PROVIDING SERVICE FOR GENERATING ROUTE BETWEEN REVIEW NFT USING SCM CODE AND VALUE-CHAIN," which claims priority to Korean Patent Application No. 10-2022-0030349, filed Mar. 10, 2022. All sections of the aforementioned application(s) are incorporated herein by reference in its entirety.

TECHNICAL FIELD

The present disclosure relates to a method of providing a service for generating a channel between a review non-fungible token (NFT) and a value-chain using a supply chain management (SCM) code. More particularly, the present disclosure is related to a technology for providing various types of information through review NFTs of third consumers by generating a channel between value-chains of e-commerce or consignment sales transaction through the review NFTs produced by consumers and newly generating and sharing information necessary for transaction to provide various access channels to price information and products of sellers to the third consumers.

BACKGROUND

Recently, non-fungible tokens (NFTs) have been in the spotlight because an NFT may prove a transaction of ownership on networks connected through the Internet. An NFT utilizes a blockchain technology, but unlike existing virtual assets, has a characteristic of being unable to be exchanged by assigning separate, unique recognition values to digital assets. Since an NFT is based on blockchain, all related information such as ownership and sales history is stored on the blockchain, and therefore originality can be proven, and because data such as owner information and transaction history cannot be forged or falsified, integrity can be secured.

However, NFTs are being used only at a technically low level in that NFTs are used for the purpose of proof of original ownership of digital content. Accordingly, technology development that enables NFTs to be actively utilized in various transaction situations is required.

A blockchain platform using review NFT data as a mediator is composed of numerous decentralized participants. Economic activity occurs between third consumers and sellers, and a reward is returned to a review NFT creator who acts as a mediator for this activity. The reward is made from sellers to consumers (reviewers), which means a transfer of wealth and should be based on actual transactions. In addition, a production volume of the review NFTs may be determined in proportion to the size of the reward, which may result in the generation of review data for products that have not actually been used. Such information may cause errors even in simple evaluations of good/bad, which does not provide information suitable for decision-making by sellers and third consumers, and may destroy the trust in this transaction method itself. Therefore, separate from the oracle issue, improvements are required to determine whether the review data is based on actual use by actual buyers.

SUMMARY

The present disclosure provides a method of providing a service for generating a channel between a review non-fungible token (NFT) and a value-chain using a supply chain management (SCM) code. More specifically, the present disclosure provides a technology for providing various types of information through review NFTs of third consumers by generating a channel between value-chains of e-commerce or consignment sales transactions through the review NFTs produced by consumers and newly generating and sharing information necessary for transactions to provide various access channels to price information and products of sellers to the third consumers.

According to one embodiment of the present disclosure, a method of providing a service for generating a channel between a review non-fungible token (NFT) and a value-chain using a supply chain management (SCM) code, which is performed by a computing device, includes: managing, by a platform server, a transaction situation between a seller and a consumer with a management information system; specifying, by the platform server, a transaction fact and transaction item of the consumer when a purchase by the consumer is confirmed; generating, by the platform server, an SCM code for the specified item and providing the generated SCM code to the consumer; and generating, by the platform server, a channel of a review NFT generated by the consumer using the SCM code and a third consumer.

The managing, by the platform server, of the transaction situation between the seller and the consumer with the management information system may include: requesting and receiving order payment information of a customer to and from an external platform; and confirming a transaction between the seller and the consumer based on the received order payment information.

The managing, by the platform server, of the transaction situation between the seller and the consumer with the management information system may include: collecting receipt information of the consumer by the platform server; requesting sales information to the seller based on the collected receipt information; and managing the transaction situation based on the received sales information.

The method may further include, after the generating of the channel of the review NFT and the third consumer, performing a transaction between the third consumer and the seller on a blockchain node of the review NFT.

The performing of the transaction between the third consumer and the seller on the blockchain node of the review NFT may include verifying the transaction by a smart contract on the blockchain node of the review NFT.

The method may further include blocking, by the platform server, the generated channel when a transaction corresponding to the generated review NFT is canceled.

According to a method of providing a service for generating a channel between a review non-fungible token (NFT) and a value-chain using a supply chain management (SCM) code according to the present disclosure, by newly generating and sharing information necessary for a transaction to provide various access channels to price information and products of a seller to a third consumer, it is possible to provide various types of information using the review NFT of the third consumer as a mediator. In particular, by proving that the review NFT is data based on actual purchase and use, it is possible to provide reliable information on products to the third consumer and allow the seller to understand specific information on the utility of the consumer according to the consumption of his/her products.

According to the present disclosure, since various variables such as price information of a product, whether a product is in stock, and whether a product can be sold according to seasonal influence can occur due to a difference between a purchase time of a reviewer and a purchase time of a third consumer, to prevent the utility of the review NFT data from decreasing due to information mismatch between a seller and a third-party consumer, it is possible to provide real-time changed information through the channel between the review NFT and the value-chain through a platform that contains information on a separate seller or a plurality of sellers from a blockchain platform. In addition, in the case of the same product+single seller (ex., franchise), it is possible to provide various product portfolios of a seller to assist a consumer with purchase decision-making.

According to the present disclosure, in order to notify of sales promotion information in a timely manner and quickly provide information on temporary sales promotions performed by a seller to a plurality of third consumers, by displaying the information on the seller's promotions inside the NFT or outside the NFT through a social networking service (SNS), it is possible to smoothly perform the promotion.

DETAILED DESCRIPTION

Hereinafter, embodiments of the present disclosure will be described in detail with reference to the accompanying drawings so that those skilled in the art may easily practice the present disclosure. However, the present disclosure may be implemented in various different forms and is not limited to exemplary embodiments described herein.

In this specification, a non-fungible token (NFT) is a digital asset with scarcity. Since the NFT is based on blockchain, all related information such as ownership and sales history is stored on the blockchain, and therefore originality can be proven, and because data such as owner information and transaction history cannot be forged or falsified, integrity can be secured.

Since metadata and information of digital assets are distributed and stored in participating nodes through a blockchain network, forgery and falsification are impossible, and all transaction histories from an initial issuer to a current owner can be traced.

In the present disclosure, a review NFT is directly generated by a consumer, and induces the consumer to directly participate in sales based on information generated after consumption, rather than simply consuming products.

The configuration of the present disclosure is specifically reviewed and described through the drawings below.

Figure 1:
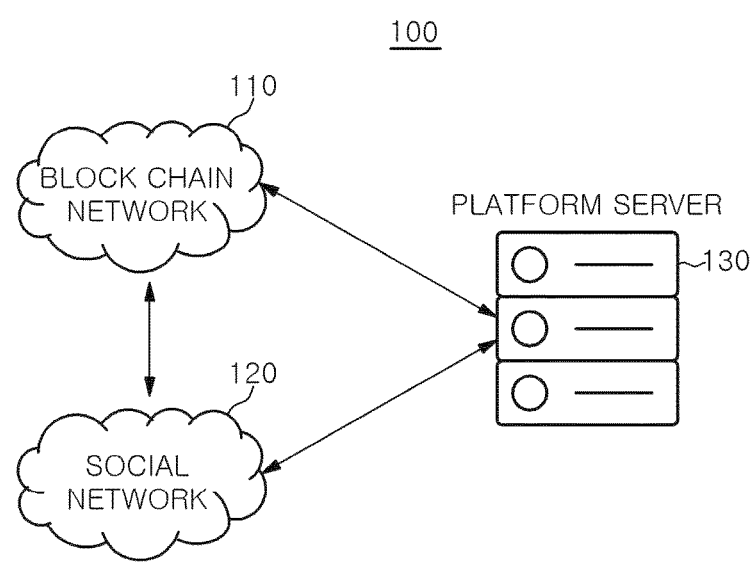
FIG. 1 is a diagram illustrating a subject performing a method of generating a channel between a review NFT and a value-chain performed by a computing device according to the present disclosure.

FIG. 1 is a diagram illustrating a subject performing a method of generating a channel between a review NFT and a value-chain performed by a computing device according to the present disclosure. Referring to FIG. 1, a review NFT system 100 may include a blockchain network 110, a social network 120, and a platform server 130.

The review NFT system 100 may provide an environment that automatically connects program codes and appropriate software and hardware execution environments required for executing the program codes. That is, when requirements for hardware that may execute a program code requested by a user are set, the review NFT system 100 may search for an optimal computer that satisfies the requirements among computers registered as nodes by the platform server 130 system and/or the blockchain network 110 system and connect the retrieved computer to the program codes. In this way, a procedure in which the program codes are connected to nodes on the blockchain network 110 system may be referred to as a "linking procedure," and the blockchain network 110 system that provides such an environment may be referred to as a "linked cloud." In addition, the containerized program code can be downloaded to the computer and immediately executed so that a user can easily receive the execution result.

The social network 120 may be a public network that a user can generally access through a communication network such as the Internet for easy access to the user's transaction target goods and services. The user may search for information on the transaction target goods and services disclosed through the social network 120, and when the user intends to transact the transaction target goods and services, the review NFT system 100 may load an ordering system that allows the user to transact the transaction target goods and services through the platform server 130, and when the user intends to confirm the review NFT for the transaction target goods and services of interest, the review NFT system 100 may confirm the review NFT information on the blockchain network 110.

The review NFT may include NFT metadata and an NFT smart contract. The NFT metadata may store ownership information of review data of goods subject to consignment sales, object information related to characteristics of review data of the goods or services subject to consignment sales, URI information connected to a program code including worker node address information with which the review data of goods or services subject to consignment sales can be implemented, etc.

Meanwhile, NFT media data connected to the NFT metadata may be code data of the review data of goods or services subject to consignment sales, preprocessed data for artificial intelligence learning, or the like, which may be data stored in an external storage or an InterPlanetary File System (IPFS).

The NFT smart contract may receive the transaction including the NFT metadata information and mint review NFT of goods or services subject that includes a review data for the goods or services to consignment sales corresponding to the received transaction.

Meanwhile, when the transaction is finally verified at a blockchain consensus node, the NFT minted on the NFT smart contract may serve as a persistent identifier to which the blockchain network address is connected.

The platform server 130 may include all of the components for searching for a node having an execution environment for executing a program code on the blockchain network 110 and enabling the program code to be executed on the node, and is not limited to a specific example.

Figure 2:
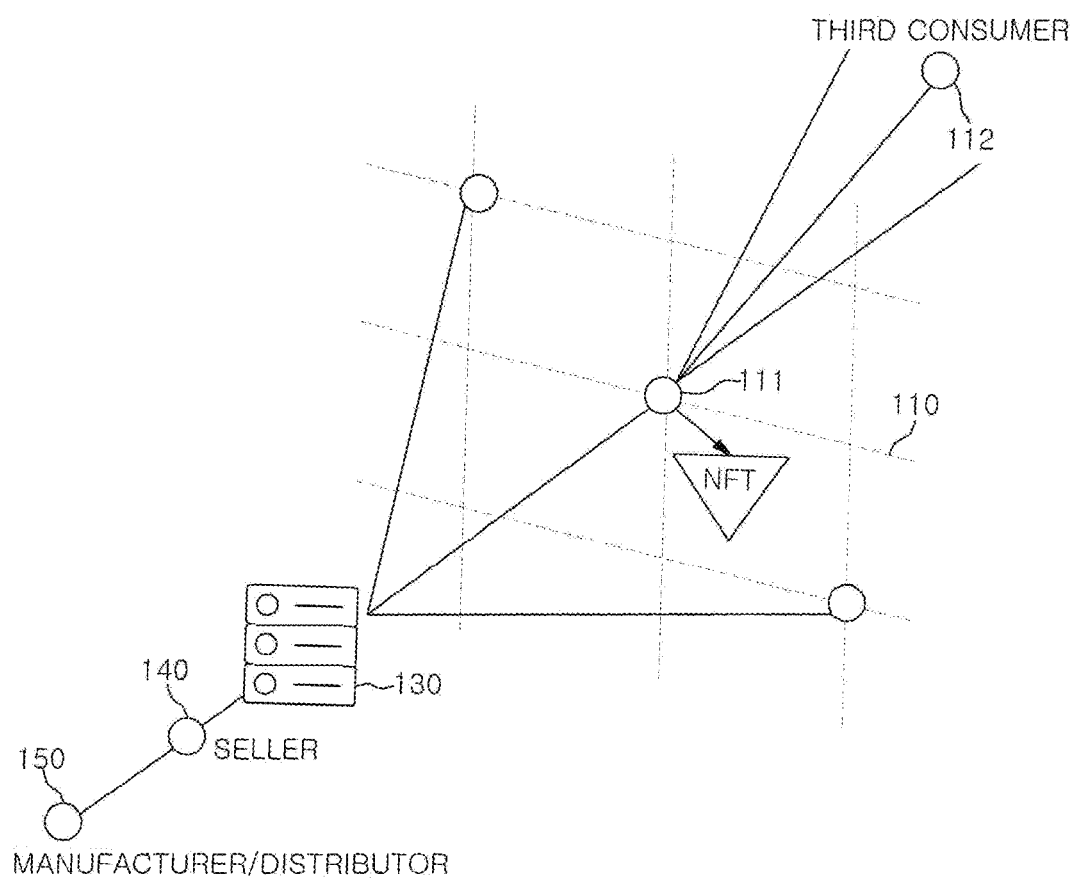
FIG. 2 is a diagram illustrating an example of a transaction of main nodes performing a method of generating a channel on a blockchain network in which a program code according to an embodiment of the present disclosure is executed.

FIG. 2 is a diagram illustrating an example of a transaction of main nodes performing e-commerce on a blockchain network in which a program code according to an embodiment of the present disclosure is executed. FIG. 2 illustrates that the platform server 130 constructs a channel (or route) between an NFT on the blockchain network 110 and a seller or a manufacturer/distributor.

In the present disclosure, the channel may be referred to as a distribution channel because it represents the distribution process of a transaction item on a blockchain network 110. When a channel is formed between different entities, one entity connected to the channel may access another entity. The channel may provide information about another entity connected to the channel (e.g., review data included in a review NFT) to a specific entity (e.g., a third consumer node 112), or may be used by a specific entity (e.g., a platform server 130) to track the distribution process represented by the channel.

Additionally or alternatively, the channel may be a channel between an NFT and a seller node 140, or a channel between an NFT and a third consumer node 112. A channel between a review NFT 113 and a third consumer 112 may be generated, and the generation and control of the channel may be executed by the platform server 130. A consumer node on the blockchain network 110 may transact a product (goods and services subject to transaction) from a seller node 140 or a manufacturer/distributor node 150 and mint the review for the transaction to the blockchain network 110 in the form of the review NFT.

The seller node 140 may sell the goods or services subject to transaction. The manufacturer/distributor node 150 may provide the goods or services subject to transaction to a seller.

In the present disclosure, the seller node 140, the manufacturer/distributor node 150, the consumer node 111 to mint the review NFT, and the third consumer node 112 each have a unique code for identifying the node, and the corresponding code may be managed by a supply chain management (SCM) system of the platform server 130.

In addition, the seller node 140 may transmit a plurality of pieces of product information to be sold based on its own code to a consumer node. The plurality of pieces of product information may each include the corresponding SCM code, and the SCM code may be managed by the SCM system of the platform server 130.

The manufacturer/distributor node 150 may transmit a plurality of pieces of product information to be supplied based on its own code to the seller node. Alternatively, the manufacturer/distributor node 150 may directly transmit the plurality of pieces of product information to the consumer node, but the present disclosure is not limited thereto. The plurality of pieces of product information may each include the corresponding SCM code, and the SCM code may be managed by the SCM system of the platform server 130.

The blockchain network 110 connects the seller node 140, the consumer node 111, and the NFT and the third consumer 112 to each other. Furthermore, the blockchain network 110 is configured to generate the NFT by the third consumer 112 so that each node of the blockchain may perform the role of the platform rather than a centralized platform. The purchase loss occurring by passing through the NFT may be offset by each consumer securing a profit through the generation of the NFT.

FIGS. 3 to 6 illustrate a method of providing a service for generating a channel between a review NFT and a value-chain using SCM code executed by a computing device.

Specifically, the platform server 130 manages the transaction situation between the seller and the consumer with the management information system on the platform server 130. According to various embodiments, the managing the transaction situation may include an operation of requesting and receiving order payment information of a customer to and from an external platform and confirming a transaction between the seller and the consumer based on the received order payment information. Then, the platform server 130 may obtain the transaction target product, transaction price, payment method, transaction occurrence time, and other transaction-related information for the transaction that occurred between the seller node and the consumer node for the confirmed transaction. In some embodiments, the transaction price and payment method may be a token (e.g., cryptocurrency) that can be transferred on the blockchain network 110.

According to various embodiments, the management may include an operation of collecting receipt information of a consumer by the platform server, requesting sales information to a seller based on the collected receipt information, and managing a transaction situation based on the received sales information. The said sales information may be the transaction-related information. The external platform may include, but is not limited to, a card company server, a payment agency server, etc.

In various embodiments, the platform server 130 specifies a transaction fact and transaction item of a consumer when a purchase by the consumer node 111 is confirmed or completed. The platform server 130 generates an SCM code for the specified item and provides the generated SCM code to the consumer. The consumer node 111 may issue a review NFT for a specific item, i.e., a transaction item, on the blockchain network 110 based on the SCM code.

In certain embodiments, the consumer node 111 initiates a transaction requesting the minting of the review NFT 113. This transaction includes a request for issuance of the review NFT 113 and the user input data to be included in the review NFT 113. The user input data includes the SCM code for the specific item. The transaction is signed using a private key of consumer node 111. This signature verifies that the transaction originates from the user and ensures the integrity and authenticity of the transaction. The consumer node 111 propagates the signed transaction to the blockchain network 110. The blockchain network 110 processes the signed transaction to issue the review NFT 113. Specifically, the blockchain network 110 verifies the transaction, which involves checking the validity of the user's digital signature, the appropriateness of the smart contract call, and whether the user has the authority to issue the NFT (e.g., sufficient funds or tokens). If the verification is successful, the blockchain network 110 executes the NFT smart contract. Upon execution of the NFT smart contract, the following series of processes occur: i) generating the review NFT 113, ii) storing the metadata of the review NFT 113, and iii) assigning ownership of the review NFT 113. Specifically, the NFT smart contract generates the review NFT 113 with a unique ID. The review NFT 113 includes the NFT metadata described above. The object information related to the characteristics of the review data of the goods or services that are the subject of the consignment sale included in the NFT metadata includes the SCM code corresponding to a specific transaction item such as the goods or services.

The metadata of the generated review NFT 113 can either be stored on the blockchain or in a decentralized storage outside the blockchain (e.g., IPFS (InterPlanetary File System)). In the latter case, only the storage location (e.g., reference link) of the decentralized storage for accessing the metadata is stored on the blockchain. The generated NFT is then assigned to the address of consumer node 111 that requested the issuance.

The issuance process of the review NFT 113 is recorded on the blockchain. Specifically, the blockchain network 110 generates a block that includes the verified transaction, which is then added to the existing blockchain and propagated across the blockchain network 110. Each node in the network receives this new block and appends it to its own copy of the blockchain. As a result, participants in the blockchain network 110 share the knowledge of the issuance of the review NFT 113.

The platform server 130 generates a channel of the review NFT generated by the consumer using the SCM code and the third secondary consumer node 112. The platform server 130 is also a node participating in the blockchain network 110 and thus, can share the fact of issuing the review NFT through the blockchain network 110. When receiving the fact of issuing the review NFT, the platform server 130 may create a channel between the review NFT 113 and the third consumer node 112. The third consumer node 112 may access the review NFT through the channel between the third secondary consumer node 112 and the review NFT 113.

The transaction between the third secondary consumer node 112 and the seller node 140 may be performed on the blockchain node of the review NFT. The seller for the third consumer may correspond to the consumer node 111. Specifically, the consumer node 111 may be treated as a seller for the third consumer in terms of generating a review NFT and selling the review data of the review NFT to induce an offline transaction between the third consumer and the seller of the first seller node 140. The seller for the third consumer, i.e., the consumer node 111, does not actually correspond to an offline product wholesaler/retailer. That is, the consumer node 111 may be a secondary seller performed after the primary sale to generate the review NFT. The secondary seller, the consumer node 111, may be a transaction information seller who does not sell products offline or a secondary seller who sells actual products.

For example, the third consumer corresponding to the third consumer node 112 in FIGS. 3 to 6 below is a secondary consumer. The seller for the above third consumer may correspond to the initial consumer node 111 that has initially transacted with the seller node 140 as a secondary seller.

This transaction may be verified by a smart contract on the blockchain node of the review NFT. Specifically, the blockchain network 110 verifies a transaction for a transaction between a third consumer node 112 and a seller node 140. This is a process of verifying whether the digital signature of the transaction requester (e.g., the third consumer node 112) for the transaction is valid and whether the user has the authority to transact (e.g., sufficient funds or tokens).

The content of the specific channel generation will be described below. For clarity of explanation, the third consumer node 112 is referred to as a secondary consumer node, and the initial consumer node 111 is referred to as a secondary seller node. Another third consumer node among the third consumer nodes 112 for the secondary seller node 111 is referred to as a secondary third-party consumer node 114. The platform server 130, where a transaction between the secondary consumer node 112 and the secondary seller node 111 may occur, is referred to as a specific platform server 130.

Figure 3:
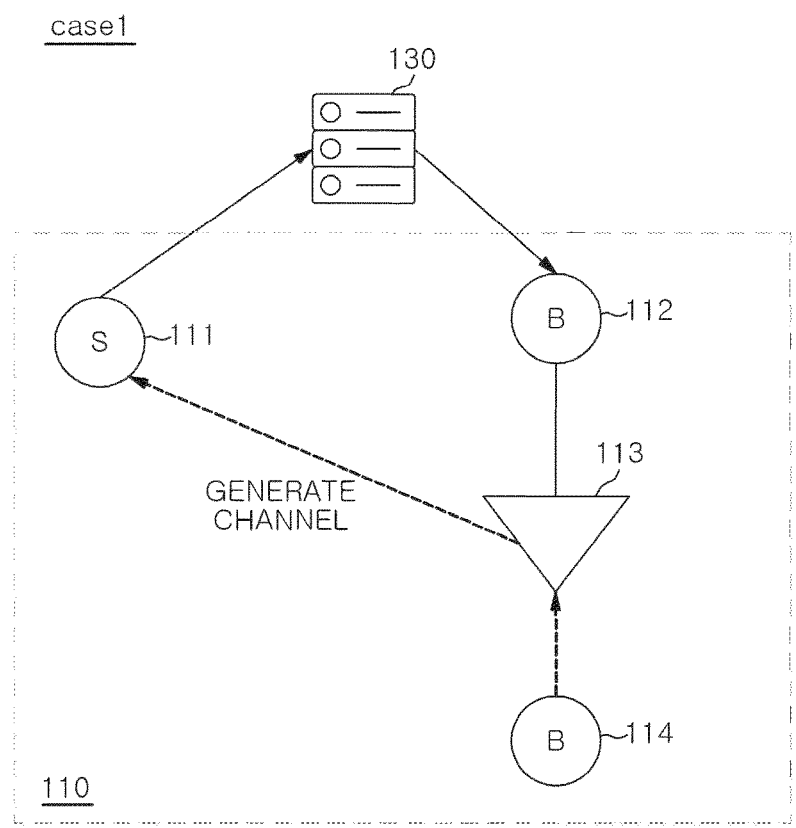
FIG. 3 is a diagram illustrating channel generation performed by the computing device according to a first embodiment.

FIG. 3 is a diagram illustrating the channel generation performed by the computing device according to a first embodiment. FIG. 3 illustrates an example of generation of the review NFT 113 and direct generation of a channel between the review NFT 113 and the secondary seller node 111 when the transaction for the product between the secondary consumer node 112 and the secondary seller node 111 passes through the platform server 130.

The platform server 130 may confirm an order payment situation occurring in the transaction between the secondary seller node 111 and the secondary consumer node 112 through a management information system (MIS).

When the platform server 130 confirms that the purchase of the transaction target product sold by the secondary seller node 111 is confirmed at the secondary consumer node 112, the platform server 130 confirms the transaction fact and specifies the transaction item.

The platform server 130 generates an SCM code for the specified item and provides the generated SCM code to the secondary consumer node 112.

The secondary consumer node 112 may generate the review NFT to include the SCM code. The review NFT 113 is used to generate the distribution channel between the third consumer 114 and the secondary seller node 111. The generated channel is controlled by the platform server 130.

Figure 4:
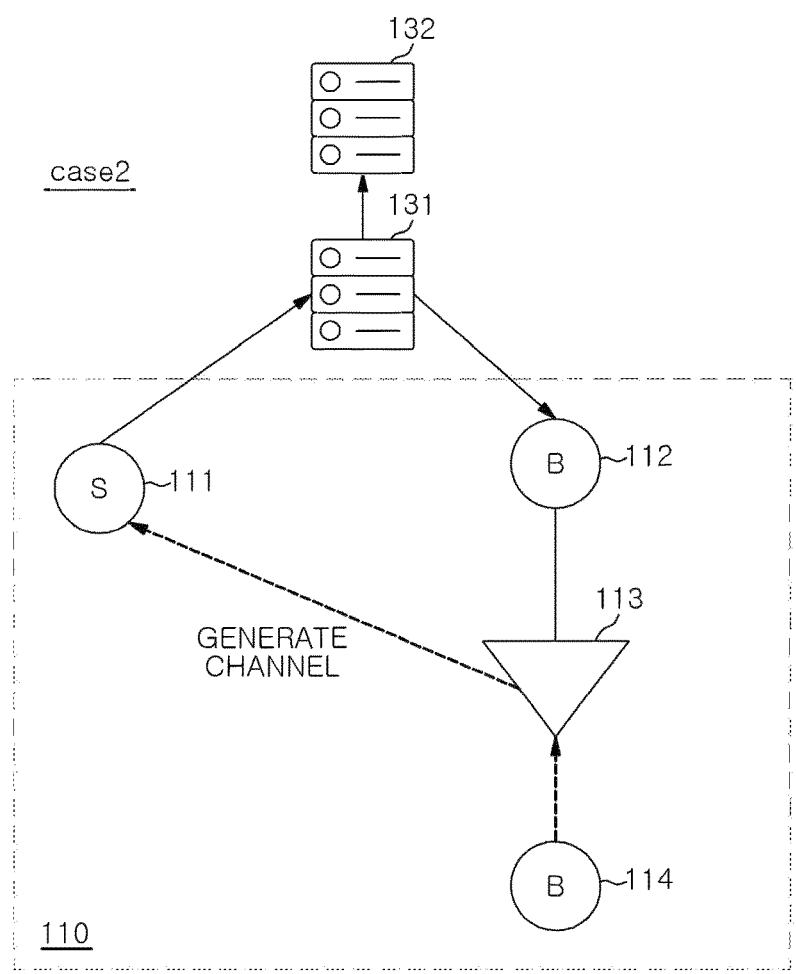
FIG. 4 is a diagram illustrating channel generation performed by a computing device according to a second embodiment.

FIG. 4 is a diagram illustrating channel generation performed by a computing device according to a second embodiment. FIG. 4 illustrates an example of the generation of the review NFT 113 and the direct generation of the channel between the review NFT 113 and the secondary seller node 111 when the transaction for the product between the secondary consumer node 112 and the secondary seller node 111 is performed through an affiliate platform 131 without directly passing through a platform server 132. The affiliate platform 131 is a server operated by a different operator than the platform server 130, 132.

When the platform server 132 cannot confirm the order payment situation occurring in the transaction between the secondary seller node 111 and the secondary consumer node 112, the platform server 132 may request and receive the order payment information of the consumer to confirm the transaction on the affiliate platform 131. Failure to confirm the order payment status occurs when the platform server 132 requests order payment information or transaction information from the secondary seller node 111 or secondary consumer node 112, but fails to receive the information within a pre-specified time.

When the platform server 132 confirms that the purchase of the transaction target product sold by the secondary seller node 111 is confirmed at the secondary consumer node 112, the platform server 130 confirms the transaction fact and specifies the transaction item. If the platform server 132 requests order payment information or transaction information from the secondary seller node 111 or secondary consumer node 112 and receives the information within a pre-specified time, the transaction fact can be confirmed and the transaction item can be specified based on the received information.

The platform server 132 generates an SCM code for the specified item and provides the generated SCM code to the secondary consumer node 112.

The secondary consumer node 112 may generate the review NFT to include the SCM code. The review NFT is used to generate the distribution channel between the third consumer 114 and the secondary seller node 111. The generated channel is controlled by the platform server 132. The secondary consumer node 112 may issue a review NFT for a specific item, i.e., a transaction item, on the blockchain network 110 based on the SCM code. The creation of the review NFT and the channel creation have been described above with reference to FIG. 3, and thus a detailed description thereof will be omitted.

Figure 5:
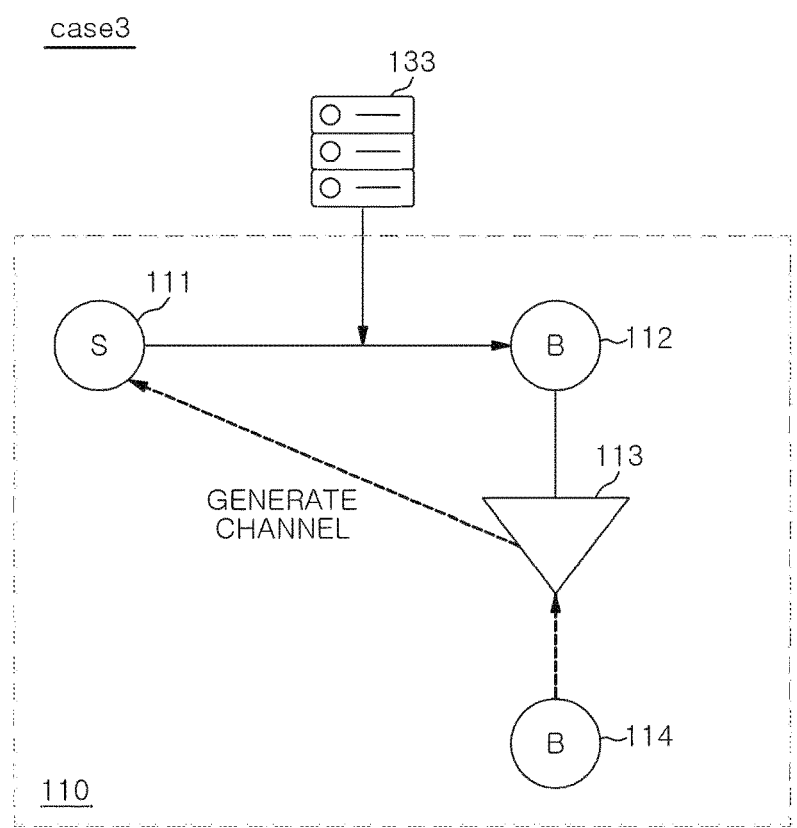
FIG. 5 is a diagram illustrating channel generation performed by a computing device according to a third embodiment.

FIG. 5 is a diagram illustrating channel generation performed by a computing device according to a third embodiment. FIG. 5 illustrates an example of the generation of the review NFT 113 and the direct generation of the channel between the review NFT 113 and the secondary seller node 111 when the transaction for the product between the secondary consumer node 112 and the secondary seller node 111 is performed without directly passing through a platform server 133.

When the platform server 133 does not confirm the order payment status occurring in the transaction between the secondary seller node 111 and the secondary consumer node 112, the platform server 133 may directly receive the purchase information of the consumer from the secondary consumer node 112 and directly receive sales information from the secondary seller node 111.

The platform server 133 may request and receive the order payment information of the customer to confirm the transaction on the affiliate platform 131. The platform server 133 collects receipt information from the secondary consumer node 112 and requests sales information such as tax invoices and cash receipts from the secondary seller node 111. The platform server 133 generates an SCM code for the specified item and provides the generated SCM code to the secondary consumer node 112.

The secondary consumer node 112 may generate the review NFT to include the SCM code and generate the distribution channel between the third consumer 114 and the secondary seller node 111. The generated channel is controlled by the platform server 133. The secondary consumer node 112 may issue a review NFT for a specific item, i.e., a transaction item, on the blockchain network 110 based on the SCM code. The creation of the review NFT and the channel creation have been described above with reference to FIG. 3, and thus a detailed description thereof will be omitted.

Figure 6:
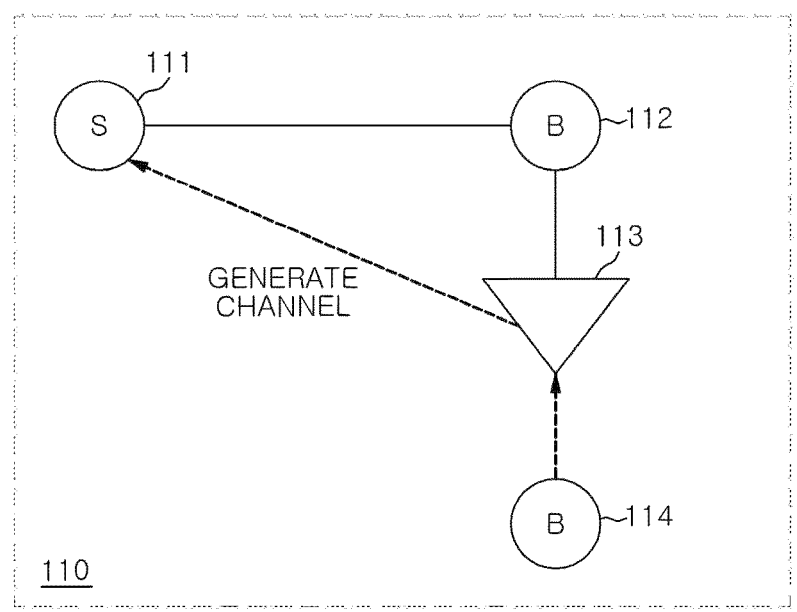
FIG. 6 is a diagram illustrating channel generation performed by a computing device according to a fourth embodiment.

FIG. 6 is a diagram illustrating channel generation with another consumer node performed by a computing device according to a fourth embodiment. FIG. 6 illustrates that when the transaction confirmation for the product between the secondary consumer node 112 and the secondary seller node 111 was already performed through the platform server (e.g., 132) and the direct channel generation was already performed between the review NFT 113 and the secondary seller node 111, subsequently a transaction between the secondary seller node 111 and the third consumer 114 is performed through the review NFT 113.

The transaction between the secondary seller node 111 and the third consumer 114 is performed by the smart contract of the review NFT 113.

In this case, in the transaction between the reward secondary seller node 111 and the secondary third consumer node 114 due to the transaction verification on the blockchain platform (111 in FIG. 1) through the review NFT 113 and the mediation of the smart contract (contract) at the node within the platform server (130 in FIG. 1), the secondary consumer node 112 provides information on various platforms (delivery, payment, and seller) to the secondary third consumer node 114. When the third consumer node 14 searches for and selects the information on the platform, expresses its intention to purchase the goods or services to platforms or sellers that provide different services, and sends money, the smart contract is established under this condition.

Referring to FIG. 6, a verification of the transaction between the secondary seller node 111 and the secondary consumer node 112 is performed by the platform server (130 of FIG. 1) using a receipt or the like (see FIG. 5).

The verification of the transaction between the secondary seller node 111 and the secondary third consumer node 114 is performed by the review NFT 113 blockchain node of the secondary consumer node 112.

Referring to FIGS. 2 to 6, the platform server 130, 131, 132 and 133 may block the generated channel when the transaction corresponding to the generated review NFT 113 is canceled.

Figure 7:
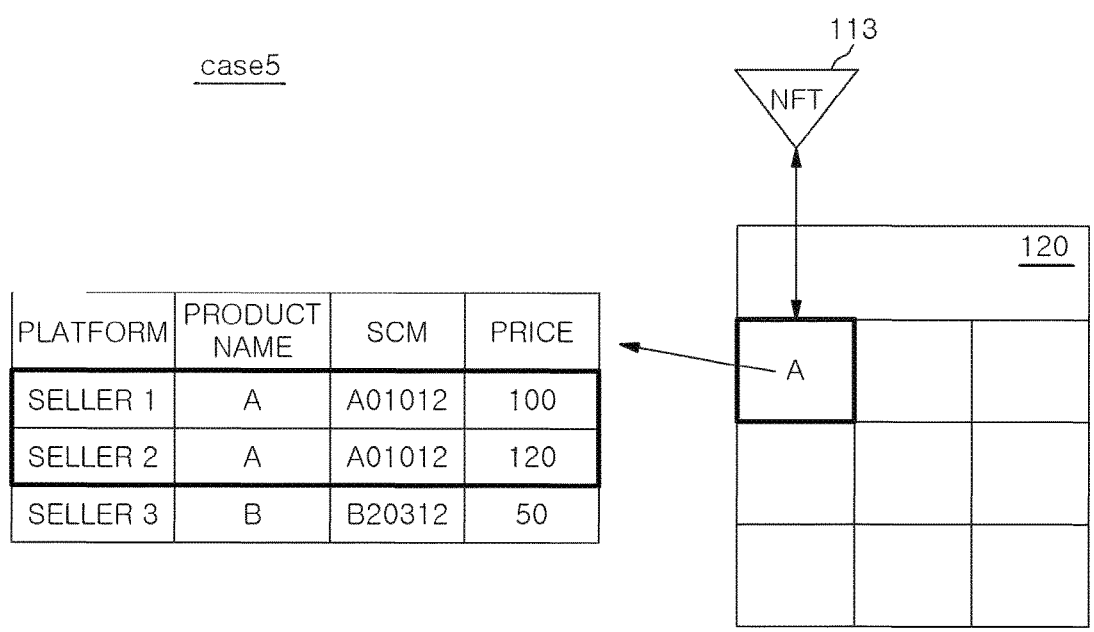
FIG. 7 is a diagram illustrating channel generation performed by a computing device according to a fifth embodiment.
Figure 8:
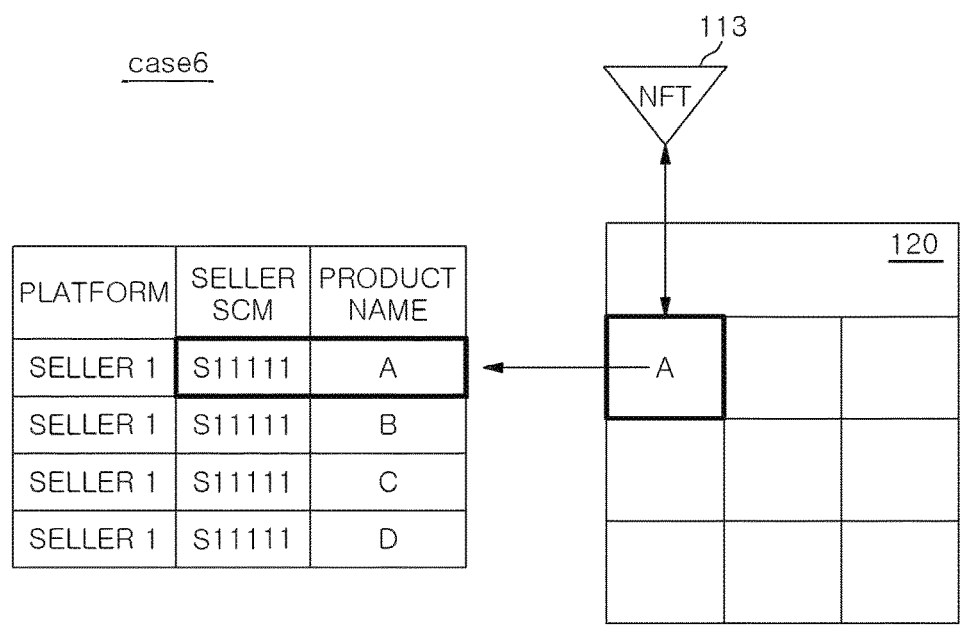
FIG. 8 is a diagram illustrating channel generation performed by a computing device according to a sixth embodiment.
Figure 9:
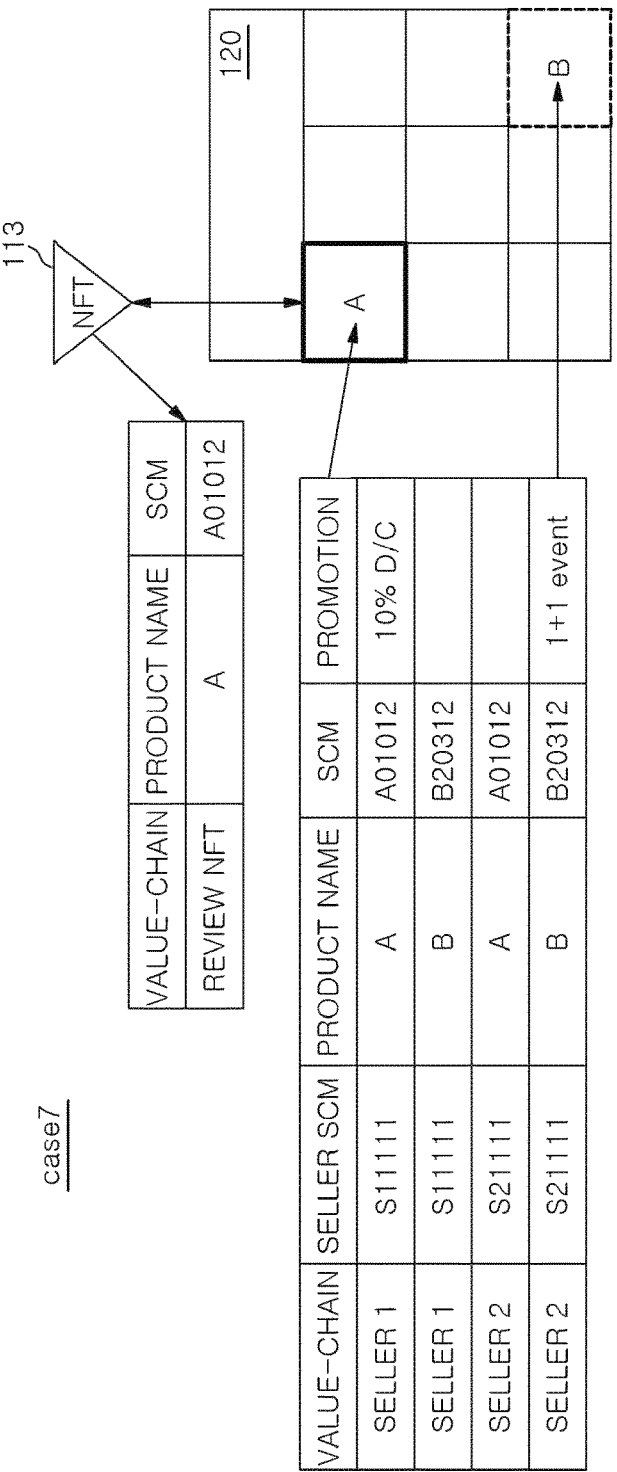
FIG. 9 is a diagram illustrating channel generation performed by a computing device according to a seventh embodiment.

FIGS. 7 to 9 illustrate connection structures with a platform server through link information of a NFT through a common SCM code held by the seller and the consumer. The platform server (not shown) receives a search request for a transaction target product through a social network. The platform server loads a review NFT for the transaction target product.

The platform server generates a channel between a plurality of sellers who provide a transaction target product having the same SCM code as an SCM code for a transaction target product of the review NFT and the review NFT.

The platform server provides information on the plurality of value-chains in which the channel is generated when the third consumer accesses the review NFT. According to an embodiment, providing the information on the value-chain provides information on products other than the transaction target product having the same SCM code provided by the plurality of sellers for which the channel is generated. According to another embodiment, providing the information on the value-chain provides the promotion information on the transaction target product having the same SCM code in the plurality of value-chains. Here, the value-chain may include at least one of a seller, a manufacturer, and a distributor.

The following is a detailed description of FIGS. 7-9.

FIG. 7 is a diagram illustrating channel generation performed by a computing device according to a fifth embodiment. Referring to FIG. 7, a channel is generated for the review NFT 113 corresponding to product A exposed on the social network 120 and a seller selling the same product A as the corresponding product A. The channel between the seller node and the review NFT 113 for the product exposed on the social network 120 is generated based on whether it has the same SCM code for the product A. As a result, it may be possible to allow a third consumer to effectively provide information on a seller selling the same product by simply accessing the review NFT 113. When the third-party consumer node 112 or the secondary third-party consumer node 114 accesses the review NFT 113 of FIG. 7, it can receive information on both seller 1 and seller 2 selling product (A).

In addition, the platform server 130 and 132 may provide the price information, the seller, and the product information together on the platform to prevent damage due to errors in the link information.

FIG. 8 is a diagram illustrating channel generation performed by a computing device according to a sixth embodiment. Referring to FIG. 8, the channel is generated for the review NFT 113 corresponding to the product A exposed on the social network 120 and the seller selling the same product A as the corresponding product A. By generating the channel between the seller node and the review NFT 113 for the product exposed on the social network 120 based on whether it has the same SCM code for the product A, it may be possible to allow the third consumer to effectively provide information on a seller selling the same product by simply accessing the review NFT 113. In addition, by providing products having different product SCM codes based on the SCM code that identifies the seller, it is possible to provide information on other related products when the consumer connects to the seller through the review NFT. (Alternatively, a direct connection to a sales server of a seller is possible.)

FIG. 9 is a diagram illustrating channel generation performed by a computing device according to a seventh embodiment. Referring to FIG. 9, the channel for the review NFT 113 corresponding to the product A exposed on the social network 120 and the seller selling the same product A as the corresponding product A is generated based on the same product SCM code. Manufacturers, sellers, and distributors having the same product SCM code each have their own individual SCM code, and the channel is generated based on the review NFT 113 and the individual SCM code. The manufacturers, sellers, and distributors may provide promotional information based on the individual SCM code.

Referring to FIG. 9, seller 1 and seller 2 handle both product A and product B disclosed on the social network 120. Seller 1 and seller 2 each have independent seller SCM codes, and a channel is generated based on the identity of the review NFT 113 for the product A and the SCM code for the product A. Although not illustrated in the drawing, when the review NFT for the product B is generated, the sellers 1 and 2 may also generate the channel for the review NFT for the product B.

Referring to FIG. 9, the seller 1 may provide a promotion for the product A, and the seller 2 may provide a promotion for the product B. Through the review NFT 113 and the generated channel, promotions for products having the same SCM code among the promotions provided by the seller may be provided in real time to the third consumer or the like who accesses the review NFT 113.

For example, when a potential third consumer searches for a specific manufacturer or seller through the social network 120, the NFT review for the product of the corresponding seller is exposed in a layout.

In this case, as described above, whether to provide the promotion through the channel generated between the review NFT and the seller can be immediately confirmed through the review NFT.

The methods, operations or techniques of the present disclosure may be implemented by various means. For example, these techniques may be implemented in hardware, firmware, software, or a combination of these. Those skilled in the art will appreciate that various exemplary logical blocks, modules, circuits, and algorithm steps described in connection with the disclosure herein may be implemented as electronic hardware, computer software, or combinations of both. To clearly describe this interchangeability of hardware and software, various exemplary components, blocks, modules, circuits, and steps have been generally described above in terms of their functionality. Whether such functions are implemented as hardware or software will depend upon the particular application and design requirements imposed on the overall system. Those skilled in the art may implement the described functionality in various ways for each particular application, but such implementations should not be construed as departing from the scope of the present disclosure.

In the hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, a computer, or a combination thereof. In firmware and/or software implementation, the techniques may be implemented as instructions stored on computer-readable media such as a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, a compact disc (CD), and a magnetic or optical data storage device. The instructions may be executable by one or more processors, and may allow the processor(s) to perform certain aspects of the functionality described in this disclosure.

When implemented in software, the techniques may be stored on a computer-readable medium as one or more instructions or code, or transmitted over the computer-readable media. The computer-readable media include both computer storage media and communication media including any medium that facilitates transmission of a computer program from one location to another. The storage media may be any available media that may be accessed by a computer. As a non-limiting example, such computer-readable media may include a RAM, a ROM, an EEPROM, a CD-ROM or another optical disc storage, magnetic disk storage or other magnetic storage devices, or desired program codes in the form of instructions or data structures, and any other media that may be used for transporting or storing desired program codes in the form of instructions or data structures and may be accessed by a computer. In addition, any access is properly called a computer-readable medium.

A software module may reside in a RAM memory, a flash memory, a ROM memory, an EPROM memory, an EEPROM memory, registers, a hard disk, a removable disk, a CD-ROM, or any other form of storage medium known in the art. An exemplary storage medium may be coupled to a processor such that the processor may read information from or write information on the storage medium. Alternatively, the storage medium may be integrated into the processor. The processor and the storage medium may reside within an application specific integrated circuit (ASIC). The ASIC may exist in a user terminal. Alternatively, the processor and the storage medium may exist as separate components in the user terminal.

In the embodiments described hereinabove, components and features of the present disclosure were combined with each other in a predetermined form. The respective components or features are to be considered selective unless separately explicitly mentioned. The respective components or features may be implemented in a form in which they are not combined with other components or features. In addition, some components and/or features may be combined with each other to configure the embodiment of the present disclosure. A sequence of operations described in the embodiments of the present disclosure may be changed. Some components or features of any embodiment may be included in another embodiment or be replaced by corresponding components or features of another embodiment. It is obvious that claims that do not have an explicitly referred relationship in the claims may be combined with each other to configure an embodiment or be included in new claims by amendment after application.

It will be obvious to those skilled in the art that the present disclosure may be embodied in other forms without departing from the technical spirit and essential features of the present disclosure. Accordingly, the above embodiments should be considered in all respects as illustrative rather than restrictive. The scope of the present disclosure should be determined by reasonable interpretation of the appended claims and all possible changes within the equivalent scope of the present disclosure.

What is claimed is:

1. A method of providing a service for generating a channel between a review non-fungible token (NFT) and a value-chain using a supply chain management (SCM) code, which is performed by a computing device, the method comprising:

managing, by a platform server, a transaction between a seller node and a consumer node with a management information system;

specifying, by the platform server, a transaction fact and transaction item of the consumer node when a purchase by the consumer node is confirmed;

generating, by the platform server, an SCM code for a specified transaction item and providing the generated SCM code to the consumer node; and generating, by the platform server, a channel between a review NFT generated by the consumer node using the SCM code and a third consumer node such that the third consumer node accesses the review NFT through the channel; and after the generating of the channel between the review NFT and the third consumer node, performing a transaction between the third consumer node and the consumer node through the review NFT on a blockchain node of the review NFT, wherein the consumer node or the seller node operates as a secondary seller node for the third consumer node and the third consumer node operates as a secondary consumer node for the consumer node, and the transaction is directed to selling review data of the review NFT;

wherein the performing of the transaction between the consumer node as the secondary seller node and the third consumer node as the secondary consumer node is performed by a smart contract of the review NFT.

2. The method of claim 1, wherein the managing, by the platform server, of the transaction between the seller node and the consumer node with the management information system includes:

requesting and receiving order payment information of a customer to and from an external platform; and confirming the transaction between the seller node and the consumer node based on the received order payment information.

3. The method of claim 1, wherein the managing, by the platform server, of the transaction between the seller node and the consumer node with the management information system includes:

collecting receipt information of the consumer node by the platform server;

requesting sales information to the seller node based on the collected receipt information; and managing the transaction based on received sales information.

4. The method of claim 1, wherein the performing of the transaction between the third consumer node and the seller node through the review NFT on the blockchain node includes verifying the transaction by the smart contract on the blockchain node of the review NFT.

5. The method of claim 1, wherein the third consumer node is configured to search and select the review NFT on the platform server, access, through the selected review NFT, information of a selected product stored in the selected review NFT, transmit a request to purchase the selected product and transfer payment for the selected product of the selected review NFT to the secondary seller node; and in response to the payment transfer and the request to purchase, executing the smart contract on a blockchain network in which the blockchain node participates.

6. The method of claim 1, wherein the review NFT includes a NFT metadata and a NFT smart contract, and wherein the NFT metadata includes ownership information of review data of goods subject to consignment sales, object information related to characteristics of the review data of the goods or services subject to consignment sales, URI information connected to a program code including worker node address information with which the review data of goods or services subject to consignment sales can be implemented.

* * * * *